United States Patent
McBroom et al.

(10) Patent No.: US 10,185,354 B2
(45) Date of Patent: Jan. 22, 2019

(54) CAPACITIVE TOUCH OPENING DISPLAY FOR ELECTRONIC DEVICE

(71) Applicant: Apple Inc., Cupertino, CA (US)

(72) Inventors: Michael D. McBroom, Leander, TX (US); Daniel L. McBroom, Leander, TX (US); Mikael M. Silvanto, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 15/264,232

(22) Filed: Sep. 13, 2016

(65) Prior Publication Data

US 2018/0074545 A1     Mar. 15, 2018

(51) Int. Cl.
  *H01M 10/42*   (2006.01)
  *G06F 1/16*    (2006.01)
  *H01F 7/06*    (2006.01)

(52) U.S. Cl.
  CPC .......... *G06F 1/1616* (2013.01); *G06F 1/1677* (2013.01); *G06F 1/1679* (2013.01); *G06F 1/1681* (2013.01); *H01F 7/064* (2013.01)

(58) Field of Classification Search
  CPC ............. Y10T 16/5401; H04M 1/0216; E05Y 2201/258; G02C 2201/46
  USPC ........... 361/679.01, 679.02, 679.21, 679.55, 361/679.26, 679.27; 455/575.1–575.4
  See application file for complete search history.

(56) References Cited

U.S. PATENT DOCUMENTS

| | | | | |
|---|---|---|---|---|
| 2006/0290670 A1* | 12/2006 | Ishimaru | .................. | G05G 5/05 345/161 |
| 2007/0133156 A1* | 6/2007 | Ligtenberg | ............ | G06F 1/1616 361/679.27 |
| 2009/0315851 A1* | 12/2009 | Hotelling | .............. | G06F 3/0418 345/173 |
| 2010/0192811 A1* | 8/2010 | Khalil | ................... | G06F 1/1632 108/28 |
| 2011/0267309 A1* | 11/2011 | Hanauer | ............... | G06F 3/0416 345/174 |
| 2014/0049894 A1* | 2/2014 | Rihn | ..................... | G06F 1/1616 361/679.27 |
| 2014/0098474 A1* | 4/2014 | Bhowmik | ............. | G06F 1/1616 361/679.01 |
| 2014/0217874 A1* | 8/2014 | Lin | ...................... | H05K 5/0221 312/326 |

(Continued)

*Primary Examiner* — Jinhee Lee
*Assistant Examiner* — Ingrid Wright
(74) *Attorney, Agent, or Firm* — Dickinson Wright RLLP (57) ABSTRACT

A capacitive touch opening system can be used with a portable electronic device having rotationally coupled components, such as a laptop computer having a display component that opens from a base component. A first magnet in a first device component (e.g., display) can be located proximate a second magnet in a second device component (e.g., base) when the display is in a closed position relative to the base. A sensor on the portable electronic device can detect a sensed event, whereupon the display is rotated automatically to an open position relative to the base using a repulsion force between the magnets. The sensor can be a capacitive touch sensor on the device housing, and may be the entire display housing. One of the magnets can be an electromagnet that may change its magnetic field. An attraction force between the magnets can exist when no sensed event is taking place.

15 Claims, 6 Drawing Sheets

(56) References Cited

U.S. PATENT DOCUMENTS

2014/0354381 A1* 12/2014 Kohlhafer .............. H01H 50/20
                                                                335/179
2017/0044810 A1* 2/2017 McBroom ............... F16D 55/02

* cited by examiner

CAPACITIVE TOUCH OPENING DISPLAY FOR ELECTRONIC DEVICE

FIELD

The described embodiments relate generally to electronic devices. More particularly, the described embodiments relate to electronic devices having hinged components.

BACKGROUND

Hinge assemblies are commonly used to allow electronic device components to move relative to one another. For example, a laptop computing device can include a base component that is rotationally coupled to an upper display component by way of a hinge assembly. It is often desirable to provide features to assist a user in moving the upper component of a laptop computing device between closed and open positions. One such feature can be a finger scoop located on the base component, the upper display component, or both. A finger scoop can be a recess in the housing of one or both components at a location where the components meet when closed, such that a user can insert a finger into the finger scoop to assist in opening the electronic device when it is closed.

Unfortunately, a finger scoop is not the most advanced or aesthetically pleasing feature found on an electronic device. In some cases, a user still may feel as if some amount of prying or inconvenience is required to open a laptop computing device. This may particularly be true where a given device has a clutch assembly in the hinge that is relatively stiff or resistant.

While current hinged component designs for electronic devices have worked well in the past, there is often room for improvement. Accordingly, there is a need for improved designs in electronic devices having hinged components that provide a better user experience when opening or closing the electronic device.

SUMMARY

Representative embodiments set forth herein disclose various structures, methods, and features thereof for the disclosed electronic devices that provide a user with assistance in opening an electronic device having hinged components.

In various embodiments, a laptop computer is described. The laptop computer includes a first component having a first magnetic element and a second component rotationally coupled to the first component and the second component has a second magnetic element. The first magnetic element and the second magnetic element form a magnetic circuit in accordance with a relative position of the first component and the second component. The laptop computer also includes a sensor. When the sensor detects a sensed event, the magnetic circuit provides a magnetic repulsion force between the first and second magnetic elements that causes the first component to rotate automatically to an open position relative to the second component.

In some embodiments, the first component is a lid having a display and the second component is a base component having a processor and a tactile input device such as a keyboard. The sensor can be a capacitive touch sensor that may include the entire outer surface of a device component or a portion thereof. One or both magnets may be an electromagnet or electro-permanent magnets having a variable magnetic force. An attraction force may exist between the magnets when there is no sensed touch or other sensed event.

Methods for opening an electronic device can include detecting a touch event, providing a repulsion force between magnets in response to the touch event, and rotating one device component to an open position relative to another component using the repulsion force. Steps can also include maintaining an attraction force between the magnets and/or providing a resistive force that inhibits rotational motion within a clutch assembly during no touch event.

A laptop computer includes a lid comprising a display assembly and a first magnetic element and a base having a second magnetic element, a tactile input device and a processor where first magnetic element and the second magnetic element form a magnetic circuit in accordance with a relative position of the lid and the base. The laptop computer also includes a clutch assembly that rotationally couples the base and the lid and comprises a torque component that provides a torque that maintains a relative rotational position of the lid and the base where the torque component provides a first torque in a closed position of the lid relative to the base and a second torque in an open position of the lid relative to the base. The laptop further includes a sensor located at the laptop computer such that when the sensor detects a sensed event, the sensor provides a signal to the processor that results in the magnetic circuit providing a magnetic repulsion force between the first and second magnetic elements that overcomes the first torque causing the lid to rotate automatically to the open position relative to the base.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following detailed description, figures, and claims.

BRIEF DESCRIPTION OF THE DRAWINGS

The included drawings are for illustrative purposes and serve only to provide examples of possible structures and methods for the disclosed portable electronic devices having a touch activated opening feature. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Electronic devices, such as laptop computers, often include components that are rotationally coupled by way of a hinge assembly. Such hinged devices often have features to assist a user in opening the device, although such features can be cumbersome in some instances. Resistance in a clutch assembly can also be an issue for opening, closing, and adjusting the rotational angle between components. There is thus a desire for improved electronic device designs that provide a better user experience when opening and closing a hinged device.

The embodiments set forth herein provide various structures and methods for an electronic device having a touch activated opening feature. In some embodiments, an electronic device can have a first device component having a first magnet, a second device component rotationally coupled to the first device component and having a second magnet, and a sensor configured to detect and act upon a sensed event. The first magnet can be located proximate the second magnet when the electronic device is closed. The first device component can be rotated automatically to an open position relative to the second device component using a repulsion force between the first and second magnets when the sensor detects a sensed event. The device can be a laptop computer where the first device component is lid having a display and the second device component is a base having a processor. The sensor can be a capacitive touch sensor that may comprise some or all of the outer surface of a device component, such as a region on a display component. One or both magnets may be an electromagnet having a variable magnetic force. An attraction force may exist between the magnets when there is no user touch or other sensed event. A user touch at the sensor when the device is closed can cause the device to pop open due to activating an electromagnet that results in the repulsion force between the magnets.

In some embodiments, a variable resistance brake clutch facilitates a rotational coupling of electronic device components. The variable resistance brake clutch can include at least a brake and an actuator. In detailed embodiments, a variable resistance brake clutch can include a rotatable shaft, a brake disposed proximate the rotatable shaft, and an actuator coupled to and configured to release the brake. The brake applies a braking or resistive force against a rotational motion of the shaft, and release of the brake results in a low to no braking or resistive force against the rotational motion. The braking force can be provided by default, and a capacitive touch sensor or other touch event sensor or input component can allow a user to actuate the actuator manually to release the brake when desired. The release can be maintained as long as the sensor detects the relevant touch event or other user input. A processor and solenoid can facilitate actuation based on a touch event at a sensor, which sensor can be located at a housing of the electronic device, such as at a back corner of a laptop upper component.

Methods for opening an electronic device can include detecting a touch event on the device, providing a repulsion force between magnets in response to the touch event, and rotating one device component to an open position relative to another device component using the repulsion force. Steps can also include maintaining an attraction force between the magnets and/or providing a resistive force that inhibits rotational motion within a clutch assembly when no touch event is detected. The brake or resistive force in the clutch assembly can be removed in response to a user input, which can be the same touch event used to activate the electromagnet.

The foregoing approaches provide various structures and methods for the disclosed portable electronic devices having a touch activated opening feature. A more detailed discussion of these structures, methods, and features thereof is set forth below and described in conjunction with FIGS. 1-8, which illustrate detailed diagrams of devices and components that can be used to implement these structures, methods, and features.

Figure 1A:
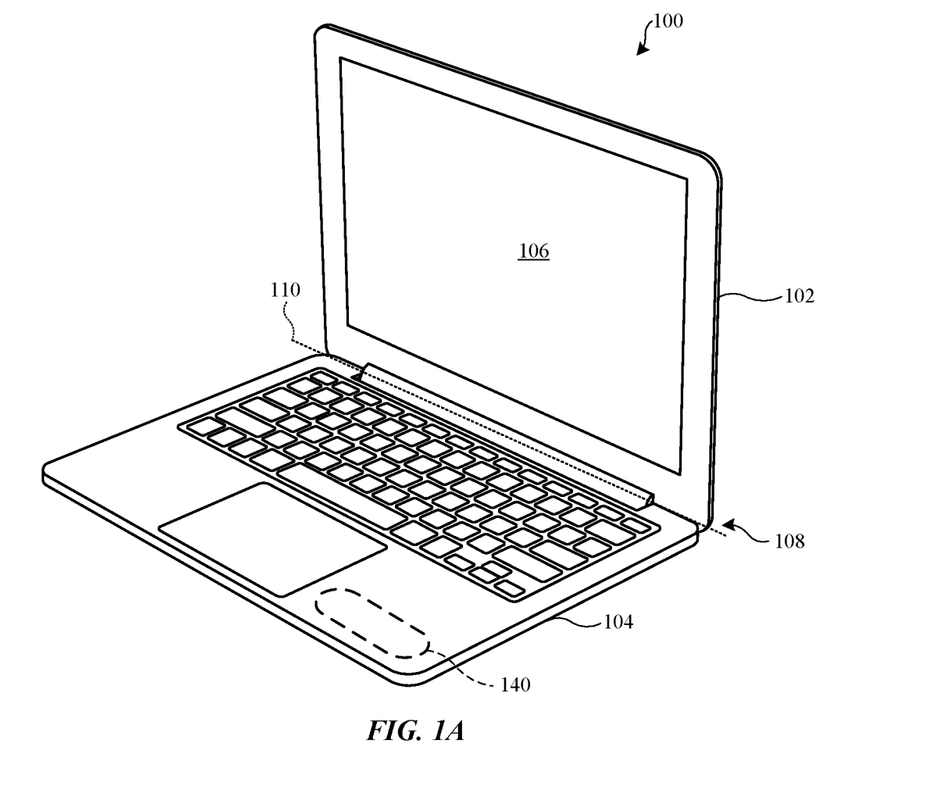
FIG. 1A illustrates in front perspective view an exemplary portable electronic device in a fully open state according to various embodiments of the present disclosure.

Turning first to FIG. 1A, an exemplary electronic device in a fully open state according to various embodiments of the present disclosure is illustrated in front perspective view. Portable electronic device 100 can take the form of a laptop computer, which can include an upper component 102 and a base component 104. Upper component 102, which can also be referred to as a lid or a display component, can house a display 106, electronics for controlling display 106, and other electrical elements. Base component 104, which can also be referred to as a base or a bottom component, can house a keypad, trackpad, processor, memory, integrated circuits, a battery, and other electrical elements suitable for operating the portable electronic device 100. Upper component 102 can be pivotally or rotationally coupled to base component 104 by a hinge assembly or other similar item located at a hinge region 108 of upper component 102 and base component 104. The hinge assembly, which can also be referred to as a clutch barrel, allows upper component 102 to rotate with respect to base component 104 about a rotational axis 110. A base magnet 140 can be located at or within base component 104 at a location that facilitates a touch activated opening of the device, as set forth below.

An "open state" for portable electronic device 100 can be defined as a state where the portable electronic device 100 is not closed. This can be for example, an arrangement where the relative orientation of upper component 102 with respect to base component 104 is at a non-zero orientation angle. While this angle is about 90 degrees for the fully open portable electronic device 100 as shown in FIG. 1A, such a non-zero angle representing an "open state" for portable electronic device 100 can be anything between about 1 and 150 degrees, for example.

Figure 1B:
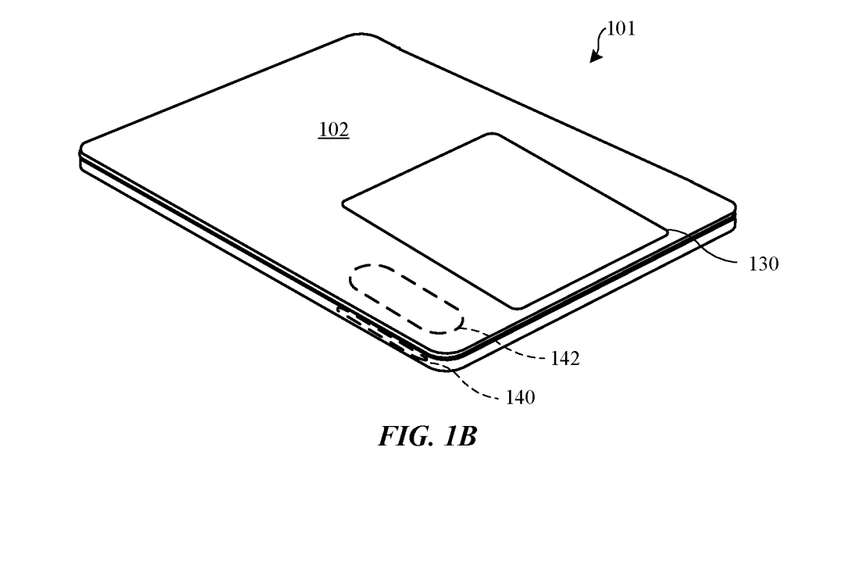
FIG. 1B illustrates in front perspective view the exemplary portable electronic device of FIG. 1A in a closed state according to various embodiments of the present disclosure.

Continuing with FIG. 1B, the exemplary portable electronic device of FIG. 1A is illustrated in front perspective view in a closed state or arrangement. Closed state 101 can involve the lid or upper component 102 being shut atop the base component 104, such that the orientation angle between upper component 102 and base component 104 is at or about zero degrees. Closed state 101 can represent a state or arrangement for when the device is fully closed, such as where a user is transporting the device or just not using the device. Such a closed state 101 may include a sleep or off mode in some embodiments. As shown, a sensor 130 can be located on the housing of upper component 102 at a location that facilitates a touch activated opening of the device, as set forth in greater detail below. In addition, an upper magnet 142 can be located at or within upper component 102 at a location such that the upper magnet 142 is proximate the base magnet 140 when the portable electronic device is closed.

Although the above examples have been illustrated with respect to a laptop computer, it will be understood that similar arrangements and concepts may also apply to other types of electronic devices. For example, clamshell type smart phones and hinged supports or other parts of electronic devices can operate similarly, and may also benefit from the various further items, methods, and concepts disclosed herein. As another non-limiting example, clamshell type smart phones or other portable electronic devices may also employ the touch activated opening features and systems as set forth herein, such that these features and systems are not limited for use with laptop computers only.

Figure 2A:
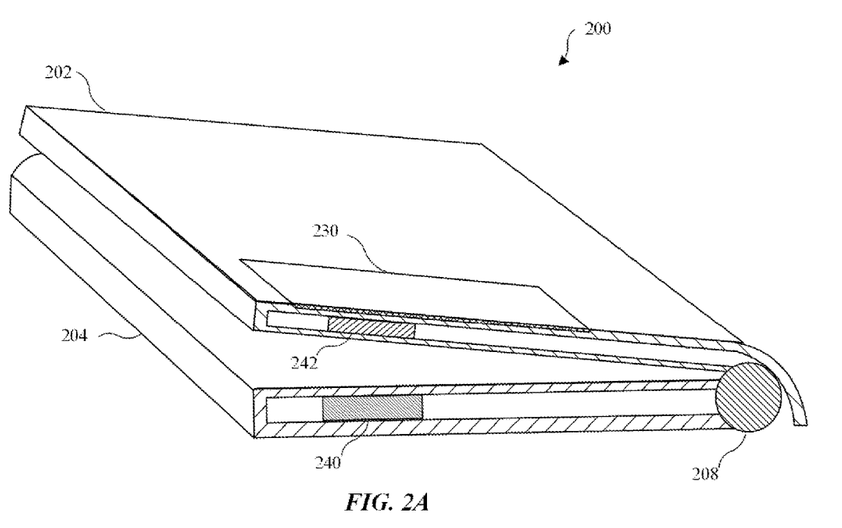
FIG. 2A illustrates in front perspective cross-sectional view an exemplary portable electronic device in an opened state according to various embodiments of the present disclosure.

Moving next to FIG. 2A, an exemplary portable electronic device is shown in an opened state in front perspective cross-sectional view. Portable electronic device 200, which again can take the form of a laptop computer, can similarly include an upper component 202 and a base component 204, which first and second device components may be the same or similar to those shown and discussed in the foregoing examples. Upper component 202 can be pivotally or rotationally coupled to base component 204 by a hinge assembly or other similar item located at a hinge region 208. A base magnet 240 can be located at or within the base component 204, and an upper magnet 242 can be located at or within the upper component 202. Also, a sensor 230 can be located on an exterior surface of the portable electronic device 200, such as on the housing of upper component 202.

As shown in FIG. 2A, portable electronic device 200 can be in an "opened state," such as that which may be experienced after a touch activated automated opening of the device. Such an opened state can be reflected in the upper component 202 being rotated some helpful amount away from a fully closed position with respect to base component 204. While a closed state or fully closed position would be reflected by an orientation angle of about zero degrees, a non-zero orientation angle between the upper component 202 and the base component 204 can be about 1 to 30 degrees for this touch activated "opened state." In some embodiments, this angle can be about 2 to 5 degrees. This opened state can reflect what the portable electronic device 200 has done automatically, with it then being up to the user to adjust manually the upper component 202 to arrive at whatever fully open angle that is desired. This further manual adjustment of the open angle of the device may also be facilitated through the use of a variable resistance brake clutch, which is provided in greater detail below with respect to FIGS. 4A, 4B-6. The touch activated opening feature or system that the portable electronic device 200 uses to open itself initially from a closed state to an opened state can involve the use of at least an input component (such as sensor 230) and first and second magnetic components in the base component 204 and the upper component 202 (such as base magnet 240 and upper magnet 242).

Figure 2B:
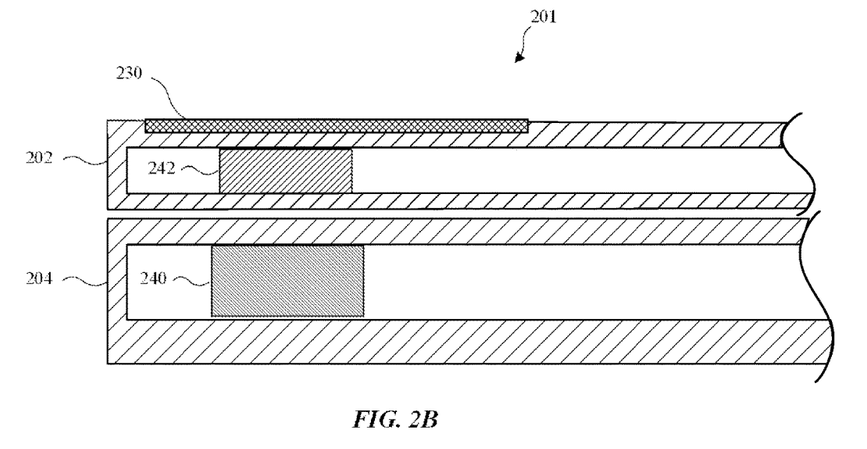
FIG. 2B illustrates in side cross-sectional view the exemplary portable electronic device of FIG. 2A in a closed state according to various embodiments of the present disclosure.

FIG. 2B illustrates the portable electronic device of FIG. 2A in a closed state in side cross-sectional view. Closed state 201 can again be where the upper component 202 is shut or closed atop the base component 204, such that the orientation angle between upper component 102 and base component 104 is at or about zero degrees. Sensor 230 can be provided on an exterior surface of the device, such as atop the housing of upper component 202. Upper magnet 242 can be located proximate to base magnet 240 when the upper component 202 is rotated to a closed position relative to the base component 204. In some embodiments, there may be an attraction force between base magnet 240 and upper magnet 242 while the portable electronic device is in a closed state 201. Such an attraction force may be a default condition, and may function to help keep the device in a closed state until opening the device is desired.

An automated device opening feature can then serve to open the portable electronic device 200 from the closed state 201 shown in FIG. 2B to the opened state shown in FIG. 2A. Such an automated device opening feature can operate in response to a user input, which can be a button, a voice command, a touch event, a remote signal, or any other suitable user input that may be desirable for a given device design. In some embodiments, a capacitive sensor can be used to detect a user touch event. Sensor 230 can be such a capacitive sensor, and can function to send an appropriate signal when the user touches sensor 230. Such a user touch at sensor 230 can then function to trigger the automated device opening feature. Although shown as covering a significant portion of the outer surface of upper component 202, it will be understood that sensor 230 can be a capacitive touch sensor of any size, shape, or location. Sensor 230 thus could be larger or smaller, could be located elsewhere on upper component 202, and/or could alternatively be located on base component 204. In some embodiments, sensor 230 could comprise the entire outer surface of the housing for upper component 202, such that any touch by a user to the housing of upper component 202 would result in an activation of the automated device opening feature.

The automated device opening feature can also be facilitated by a repulsion force between base magnet 240 and upper magnet 242. In some embodiments, a user touch event at sensor 230 can result in a repulsion force between these magnets, which then rotates the upper component 202 to the opened state. This process can be convenient to the user and may even appear to be somewhat magical, since touching sensor 230 (in some cases anywhere on the outer housing) results in the device automatically popping open to the opened state, whereupon the user can then manually adjust the upper component 202 to the desired operating angle. Again, this further manual adjustment can be aided by a variable resistance brake clutch, which is shown and discussed with respect to FIGS. 4A, 4B-6. The automated device opening feature detailed to this point reduces or eliminates the need for a finger scoop on the upper component 202 or base component 204, and allows a user to open the portable electronic device 200 and set the operating angle all by using just one hand. The user experience is thus enhanced through the implementation of this automated device opening feature.

Since it is preferable to have an attraction force or no force between magnets when the device is to remain closed, and a repulsion force can be used to facilitate an automated opening of the device, one or both of base magnet 240 and upper magnet 242 can have a variable magnetic field or force. In some embodiments, base magnet 240 can be an electromagnet that can be varied in response to signals from a processor. For example, base magnet 240 as an electromagnet can change its magnetic field by activating in response to a signal. Such a signal can be the detection of a user touch event or other user input. Upper magnet 242 can then be a simpler permanent magnet, which can have a constant magnetic force. In such embodiments, the electromagnetic core of base magnet 240 may serve as an attraction plate for the permanent magnet that is upper magnet 242 when the electromagnet is not activated. When the electromagnet is activated, then a sufficient repulsion force is created between base magnet 240 and upper magnet 242 so that upper component 202 rotates to an open state. Activating the electromagnet can be a result of there being a user touch event at sensor 230. Such an activation can take place by way of a detection signal being sent from sensor 230 to a processor, which in turn sends a command to the electromagnet to activate.

As noted above, it will be readily appreciated that other forms of input could alternatively be used to activate the system to provide a repulsion force between magnets. Such alternatives could be inductive sensors, resistive sensors, pressure sensors, push buttons, motion sensors, hall effect sensors, strain gauge sensors, voice recognition devices, remote signals, or the like. Further, the size and location of the touch activated sensor can vary as may be desired. Other ways of providing a magnetic repulsion force may also be possible. For example, both magnets may be permanent magnets, with a magnetic shield being placed therebetween during default conditions. A user touch event or other form of input could then serve to remove or displace the magnetic shield, whereupon the repulsion force between magnets then rotates the upper component open.

Figure 3:
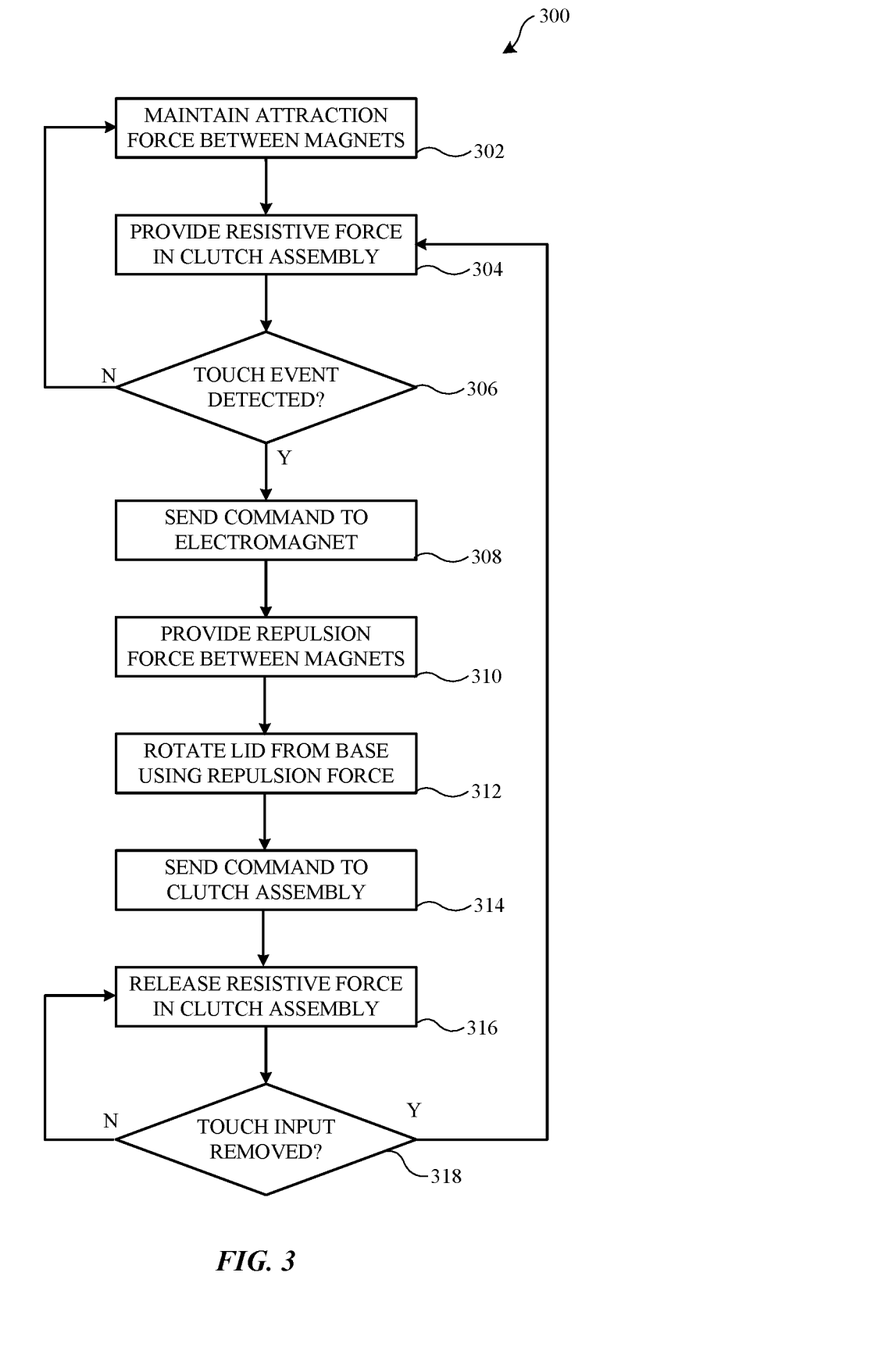
FIG. 3 illustrates a flowchart of an exemplary method performed by a processor for opening an electronic device according to various embodiments of the present disclosure.

One exemplary method for opening an electronic device according to various embodiments of the present disclosure is provided in FIG. 3. This method utilizes the automated device opening feature of FIGS. 1A-2B, and also references optional steps involving the variable resistance brake clutch of FIGS. 4A, 4B-6 below. Method 300 can be carried out by a processor or other controller that may be located at the electronic device that is being opened, for example. Method 300 can start at an optional process step 302, where an optional attraction force can be maintained between magnets. This can involve an electronic device that is in a closed position having magnets in separate device components that provide an attraction force to help keep the device in the closed position. For example, an upper magnet and a base magnet can provide an attraction force between them as a default condition to help keep an upper component closed against a base component of the electronic device, such as a laptop computer.

At a subsequent optional process step 304, a resistive force can also be provided in a clutch assembly as a default condition. Details for such an ability in a variable resistance brake clutch are provided below. This optional step and ability can also function to help keep the device in a closed position until it becomes desirable to open the device. At a following decision step 306, an inquiry is made as to whether a touch event has been detected. Again, such a touch event represents a user desire to open the device, and make take the form of other input in alternative embodiments. If no touch event is detected, then the method reverts back to step 302 (or optionally step 304) and repeats. When a touch event is detected, however, then the method moves to process step 308, where a command is sent to an electromagnet in the system. This can be a command sent by a processor after the processor receives a signal reflecting the touch event.

A repulsion force is provided between the magnets at the next process step 310, such as where the electromagnet activates in response to the sent command. At the following process step 312, the upper component (i.e., lid) is rotated from the base component (i.e, base) using the repulsion force between the magnets. This rotation then results in the device being in an opened position. An optional process step 314 involves also sending a command to the clutch assembly. This can also be a command send by the processor after the processor receives a signal reflecting the touch event. At a subsequent optional process step 316 the resistive force in the clutch assembly is released in response to the sent command. As noted below, this results in little to no resistive force in the clutch assembly, such that the upper component can be freely rotated with respect to the base component.

At a subsequent decision step 318, an inquiry is made as to whether the touch input has been removed. That is, whether the user is still touching the device at the touch sensor. If not, then the method reverts to process step 316 where the resistive force in the clutch remains released (e.g., the clutch brake is not engaged again). When the touch input is removed though, then the method reverts to optional process step 304, where the resistive force in the clutch assembly is again provided. This effectively means that the clutch brake is set and the angular orientation of the upper component is firmly set and braked once the user stops touching the sensor. The method then repeats, waiting for another touch event. The next touch event can then actuate the electromagnet to provide a repulsion force between magnets and/or actuate the brake release to release the resistive force in the clutch assembly. In some embodiments, the system can be set so as not to actuate the electromagnet unless the device is already in a closed position.

For the foregoing flowchart, it will be readily appreciated that not every step provided is always necessary, and that further steps not set forth herein may also be included. For example, added steps that involve determining whether the device is in a closed position may be added. Also, steps that provide more detail with respect to sensing and transmitting the user touch input or event, as well as other user inputs may also be added. Furthermore, the exact order of steps may be altered as desired, and some steps may be performed simultaneously. For example, steps 308-312 and 314-316 may be performed at or about the same time.

Figure 4A:
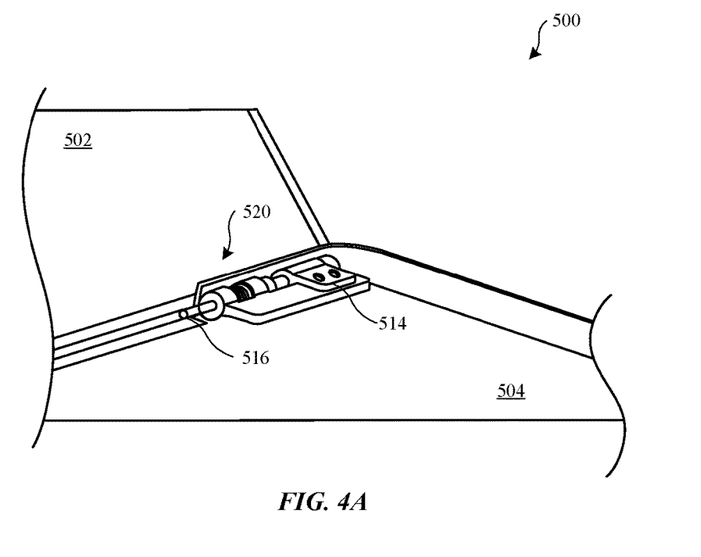
FIG. 4A illustrates in partially cut-away front perspective view an exemplary electronic device having a variable resistance brake clutch in an open configuration according to various embodiments of the present disclosure.

FIG. 4A illustrates in partially cut-away front perspective view an exemplary electronic device having a variable resistance brake clutch in an open configuration according to various embodiments of the present disclosure. Electronic device 500 can again take the form of a laptop computer, which can include an upper component 502 and a base component 504. A variable resistance brake clutch 520 can be located at a hinged region of electronic device 500. The variable resistance brake clutch 520 (or a hinge of which the clutch is a part) can include a number of items, such as a mounting bracket 514 and a shaft 516, which can be a rotatable shaft. As will be readily appreciated, shaft 516 can be adapted to rotate such that one or both of upper component 502 and base component 504 rotate with the shaft 516. In various embodiments, the upper component 502 can rotate with the shaft 516 while base component 504 does not rotate.

Figure 4B:
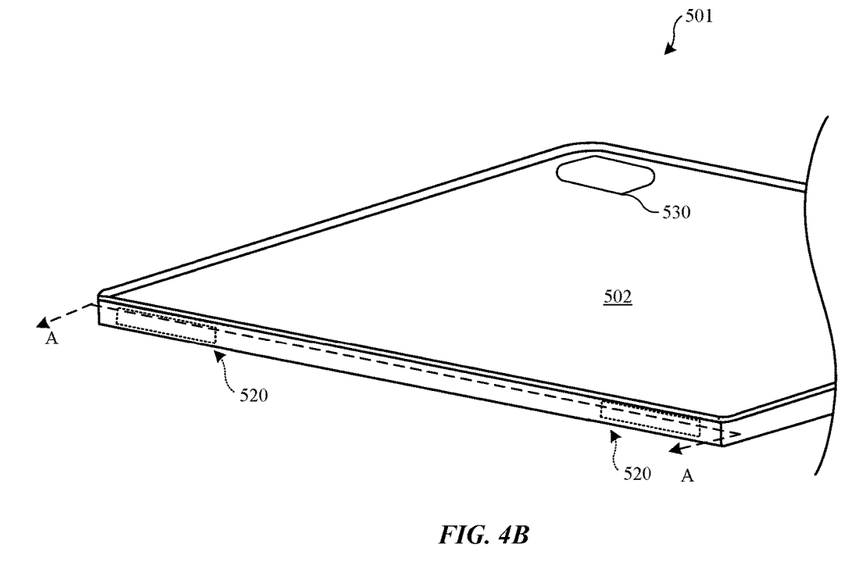
FIG. 4B illustrates in obverse perspective view the exemplary electronic device having a variable resistance brake clutch of FIG. 4A in a closed configuration according to various embodiments of the present disclosure.

FIG. 4B illustrates in obverse perspective view the exemplary electronic device having a variable resistance brake clutch of FIG. 4A in a closed configuration according to various embodiments of the present disclosure. Closed configuration 501 depicts the upper component 502 being shut with respect to the base component. As shown, two separate variable resistance brake clutches 520 can be disposed at or about the ends of a hinge region for the electronic device. The variable resistance brake clutches 520 are typically disposed within the hinge region behind an outer housing of the electronic device, and are thus depicted as dotted lines in the simple obverse perspective view of FIG. 4B. In some embodiments, only one variable resistance brake clutch might be used, while in other embodiments more than two variable resistance brake clutches might be used, as may be desired. Furthermore, a single shaft 516 might extend through both or all variable resistance brake clutches 520, or alternatively separate shafts 516 might be used for each separate variable resistance brake clutch 520.

In addition, one or more sensors 530 may be disposed about the electronic device. Such one or more sensors 530 can be configured to detect a user input and operate one or more of the variable resistance brake clutch(es) in response to the user input. In various embodiments, such one or more sensors 530 can be the same sensor(s) that detects a user touch or other input for purposes of activating the automated device opening feature detailed above. That is, the same touch event or other user input can activate the electromagnet discusses above, as well as the variable resistance brake clutch(es). Such an event can result in a signal sent to a controller or processor in the electronic device, which controller or processor can then send a command to an actuator within the variable resistance brake clutch. In various embodiments, the actuator can be configured to apply and/or release a brake within the variable resistance brake clutch 520, depending upon the clutch arrangement.

Again, in a particular example sensor 530 can be a capacitive touch sensor that is configured to detect a touch of a user, such as a finger touch. Of course, other types of sensors or user input components can alternatively or also be used to allow touch events or other user input that actuates the variable resistance brake clutches) 520. Such other sensors and inputs can include, for example, inductive sensors, resistive sensors, pressure sensors, push buttons, motion sensors, hall effect sensors, strain gauge sensors, voice recognition devices, and the like, among other suitable sensors and inputs. In some arrangements, one or more sensors within the clutch itself can sense force, movement, or a change in either, which can indicate a desire to move the components. Such a detection can also serve as a suitable touch event or other user input that triggers actuation.

One or more sensor(s) 530 or other user input(s) can be located at a strategic location for purposes of actuating the associated variable resistance brake clutch(es) 520. For example, sensor 530 can be located at a back corner of an upper portion of a laptop computer. This location can be a typical location where a user might grasp or otherwise touch the electronic device 500 when the user wishes to adjust the upper portion of the laptop or otherwise rotationally pivot one device component with respect to another device component. A touch or grasp by the user on sensor 530 at this location can thus facilitate an actuation of the variable resistance brake clutch(es) 520, whereby a brake force or other resistive force of the clutch is released or let go. This then allows the hinge coupling the upper and base portions to be freely rotatable with little to no resistive force. In various embodiments, this actuation or release of the brake force can be maintained so long as a user touch at sensor 530 is detected, or so long as a similar alternative sensor or user input remains. Again, sensor 530 may also comprise the outer surface for the entire housing of upper component 502.

In some embodiments, there may be separate sensors or input components for each of the automated device opening feature (e.g., electromagnet) and the clutch resistance (e.g., variable resistance brake clutch). For example, there may be two different user touch regions on the exterior of the electronic device. These two different touch regions can allow a user to activate one of these features but not the other, such as may be desirable for a given situation.

Other sensors and/or sensor locations may alternatively or also be used in association with the disclosed variable resistance brake clutches, such as for use in a laptop computer or other electronic device. For example, one or more accelerometers and/or gyroscopes may be used to monitor the relative position of upper component 502, as well the overall device orientation to gravity. Other possible sensors can include strain gauges, position encoders, rotary variable differential transformers, or other rotational position sensors, one or more of which can be used to determine the relative position of upper component 502 with respect to base component 504. The location of such sensors can be within the hinge region or even within the clutch itself, for example.

In various alternative embodiments, the processor or controller can facilitate an actuation pattern or time period that does not exactly match the presence of a user touch or input. For example, the processor or controller can be configured to command the solenoid or other actuator to actuate for a minimum set time period whenever a user touch or other input is detected. Such a minimum set time period can be on the order of one to ten seconds, for example. In this manner, a user can actuate the clutch and then be able to freely move the device components with respect to each other for a short period of time without needing to maintain a touch or force on the input sensor. Other patterns of actuation and deactivation are also possible.

In various embodiments, the disclosed variable resistance brake clutches can be partially activated, such that the typical full amount of braking force is reduced but not fully released. Such a partial braking force can be applied in response to various sensor inputs, such as where position and/or gravity orientation sensors provide input that indicates a modulated force may be appropriate. In such instances, the controller or processor can be configured to use the additional sensor inputs to modulate the braking force applied by the variable resistance brake clutch. For example, where the base component 504 of a laptop device is not at a flat position, detection of this condition by one or more additional sensors can provide an input to the controller or processor that results in a partial activation of the brake clutch resulting in a partial reduction in braking force to the shaft, rather than a full release or reduction of the braking force.

Figure 5:
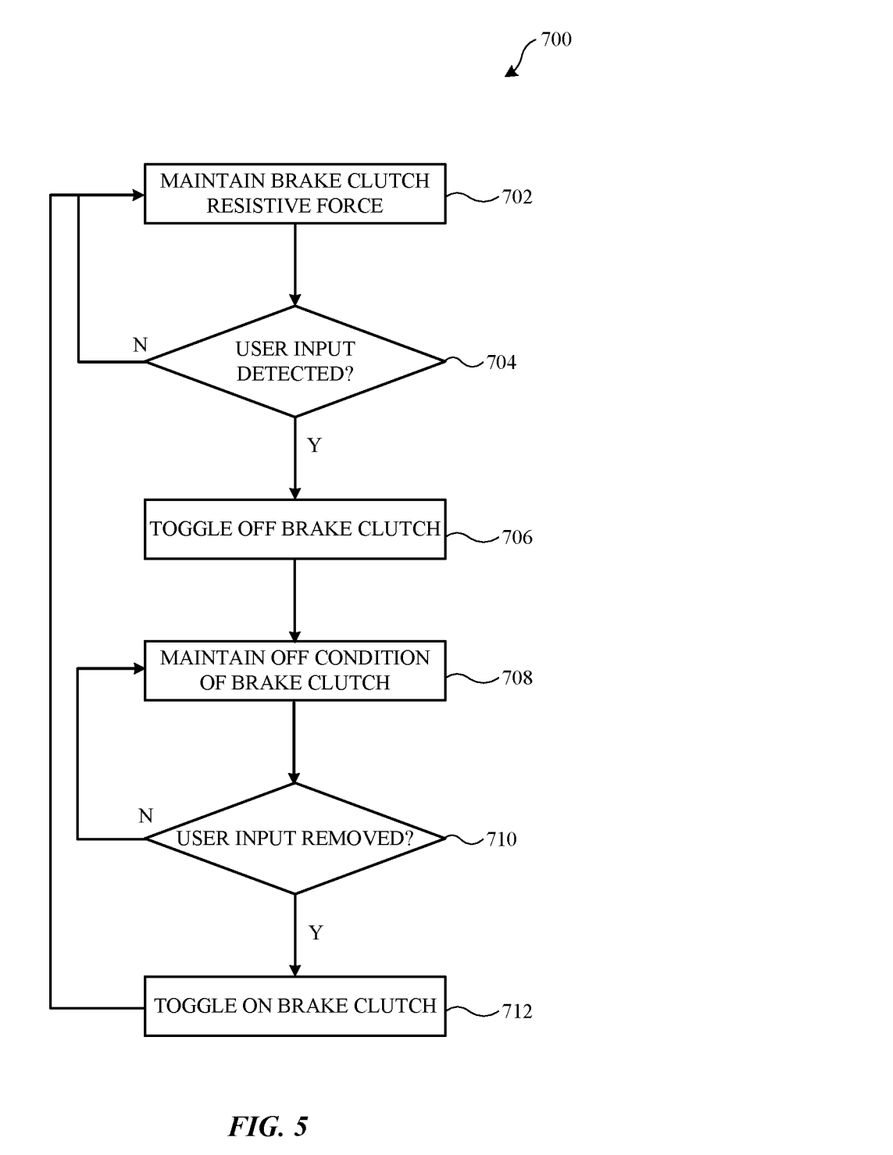
FIG. 5 illustrates a flowchart of an exemplary method performed by a processor for operating a variable resistance brake clutch for an electronic device according to various embodiments of the present disclosure.

FIG. 5 illustrates a flowchart of an exemplary method performed by a processor for operating a variable resistance brake clutch for an electronic device according to various embodiments of the present disclosure. Method 700 can be carried out by a processor or other controller that may also be located on the electronic device where the variable resistance brake clutch is located, for example. Method 700 can start at a process step 702, where a brake clutch resistive force can be maintained. Such a maintained resistive force by the brake clutch can be a default condition of the brake clutch.

At a subsequent decision step 704, an inquiry can be made as to whether a user input regarding the brake clutch has been detected. As set forth above, the user input can be a detected capacitive touch at a particular location, such as at an upper back corner of a lid or upper portion of a laptop computer, for example. Other user inputs may also apply for the brake clutch, as will be readily appreciated. If a user input is not detected, then the method reverts back to process step 702, where the resistive force is maintained. When a user input is detected at decision step 704, however, then the method moves to process step 706.

At process step 706, the brake clutch is toggled to off. This can be accomplished, for example, by actuating the brake to a disengaged position. The actuator can be a solenoid, piezo, or other suitable actuating component, which can deactivate a biasing spring that then moves a conical brake to a disengaged or holding position, for example. At following process step 708, an off condition of the brake clutch is maintained. While the brake clutch is in the off position, little to no resistive force is provided against a rotational motion of hinged components. Again, such components can be the upper and base portions of a laptop computer, for example, among other possible components. At a subsequent decision step 710, an inquiry can be made as to whether the user input has been removed. If not, then the method reverts back to process step 708, where the brake clutch remains off. If it is detected that the user input has been removed, however, then the method continues to process step 712. Such a removal of user input can be, for example, the user removing his or her finger or hand from the capacitive touch location, which can be at an upper back corner of the upper portion of a laptop computer.

At process step 712, the brake clutch is toggled to on. This can be accomplished, for example, by de-actuating the brake from a disengaged or holding position. Such a de-actuation can reactivate a biasing spring that then returns a conical brake to an engaged position, for example. Again, putting the brake back into an engaged position can result in a resistive force against a rotational motion of hinged components. With the brake clutch toggled to on, the method can then revert to process step 702, where the brake clutch resistive force is maintained. The method can then repeat at the next instance of a user input that actuates the brake clutch.

For the foregoing flowchart, it will be readily appreciated that not every step provided is always necessary, and that further steps not set forth herein may also be included. For example, added steps that involve maintaining the off condition of the brake clutch for a set time period may be added. Also, steps that provide more detail with respect to sensing and transmitting the user input or even multiple user inputs may also be added. Additional steps that involve the actuation and use of a second brake may also be added. Furthermore, the exact order of steps may be altered as desired, and some steps may be performed simultaneously.

Figure 6:
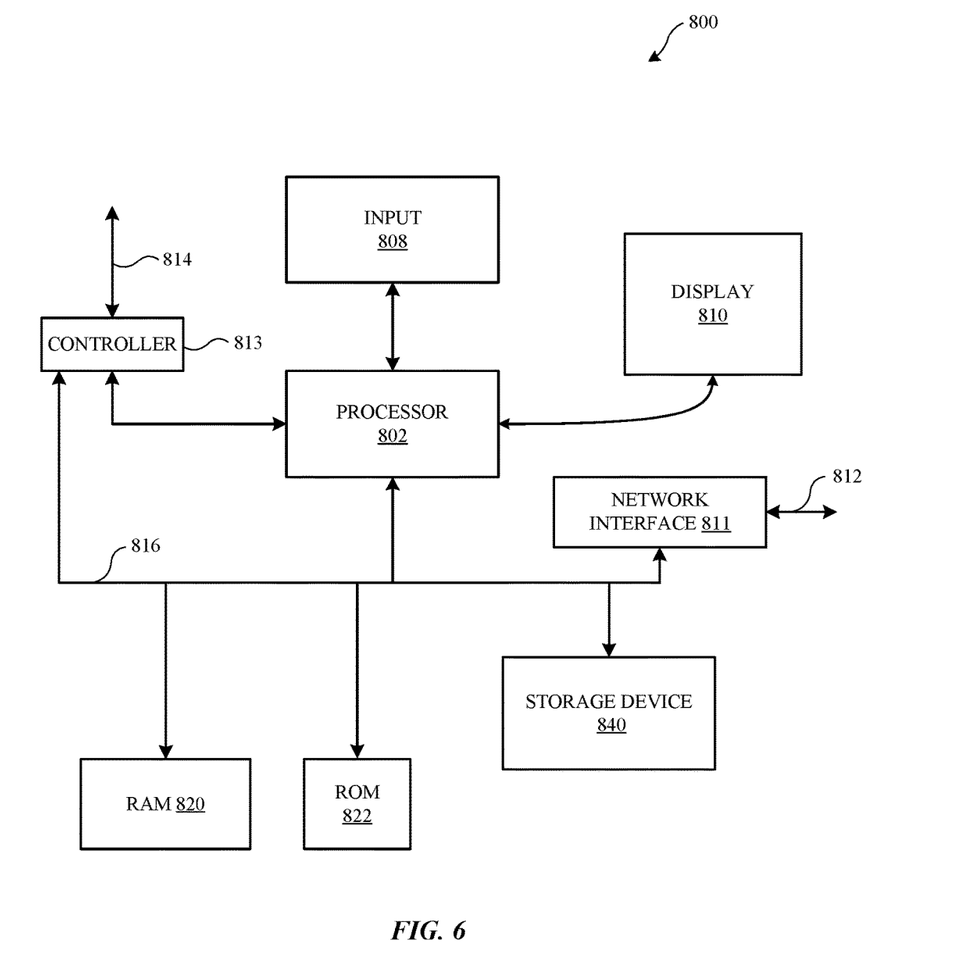
FIG. 6 illustrates in block diagram format an exemplary computing device that can be used to implement the various components and techniques described herein according to various embodiments of the present disclosure.

FIG. 6 illustrates in block diagram format an exemplary computing device 800 that can be used to implement the various components and techniques described herein, according to some embodiments. In particular, the detailed view illustrates various components that can be included in the electronic device 100 illustrated in FIG. 1. Such components can include an electromagnet, such as that which is shown in FIG. 2B and a variable resistance brake clutch, such as that which is shown in FIG. 4A, as well as a processor that controls the electromagnet and the clutch, such as by way of the methods shown in FIGS. 3 and 5. As shown in FIG. 6, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a capacitive touch surface as set forth above, as well as a button, keypad, dial, touch screen, audio input interface, visual/image capture input interface, input in the form of other sensor data, etc. Still further, the computing device 800 can include a display 810 (screen display) that can be controlled by the processor 802 to display information to the user (for example, a movie or other AV or media content). A data bus 816 can facilitate data transfer between at least a storage device 840, the processor 802, and a controller 813. The controller 813 can be used to interface with and control different equipment through and equipment control bus 814. Such equipment can include, for example, a variable resistance brake clutch, such as that which is disclosed herein. The computing device 800 can also include a network/bus interface 811 that couples to a data link 812. In the case of a wireless connection, the network/bus interface 811 can include a wireless transceiver.

The computing device 800 can also include a storage device 840, which can comprise a single disk or a plurality of disks (e.g., hard drives), and includes a storage management module that manages one or more partitions within the storage device 840. In some embodiments, storage device 840 can include flash memory, semiconductor (solid state) memory or the like. The computing device 800 can also include a Random Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 800.

In various embodiments, a laptop computer is described. The laptop computer includes a first component having a first magnetic element and a second component rotationally coupled to the first component and the second component has a second magnetic element. The first magnetic element and the second magnetic element form a magnetic circuit in accordance with a relative position of the first component and the second component. The laptop computer also includes a sensor. When the sensor detects a sensed event, the magnetic circuit provides a magnetic repulsion force between the first and second magnetic elements that causes the first component to rotate automatically to an open position relative to the second component. In some embodiments, the first component is a lid having a display and the second component is a base component having a processor and a tactile input device such as a keyboard. The sensor can be a capacitive touch sensor that may include the entire outer surface of a device component or a portion thereof. One or both magnets may be an electromagnet or electro-permanent magnets having a variable magnetic force. An attraction force may exist between the magnets when there is no sensed touch or other sensed event.

Methods for opening an electronic device can include detecting a touch event, providing a repulsion force between magnets in response to the touch event, and rotating one device component to an open position relative to another component using the repulsion force. Steps can also include maintaining an attraction force between the magnets and/or providing a resistive force that inhibits rotational motion within a clutch assembly during no touch event. In one embodiment, the method also includes maintaining an attraction force between the first magnet and the second magnet when no touch event is detected on the electronic device and providing a resistive force that inhibits rotational motion within an automated clutch assembly at the electronic device when no touch event is detected on the electronic device. In one embodiment, the method is performed by a processor at the electronic device. In one embodiment, the method also includes sending automatically a command from the processor to the second magnet in response to detecting the touch.

A laptop computer includes a lid comprising a display assembly and a first magnetic element and a base having a second magnetic element, a tactile input device and a processor where first magnetic element and the second magnetic element form a magnetic circuit in accordance with a relative position of the lid and the base. The laptop computer also includes a clutch assembly that rotationally couples the base and the lid and comprises a torque component that provides a torque that maintains a relative rotational position of the lid and the base where the torque component provides a first torque in a closed position of the lid relative to the base and a second torque in an open position of the lid relative to the base. The laptop further includes a sensor located at the laptop computer such that when the sensor detects a sensed event, the sensor provides a signal to the processor that results in the magnetic circuit providing a magnetic repulsion force between the first and second magnetic elements that overcomes the first torque causing the lid to rotate automatically to the open position relative to the base. In one embodiment, the sensed event includes a user touch at an outer surface of the laptop computer. In one embodiment, the sensor includes a capacitive touch sensor located at an outer surface of the laptop. In one embodiment, the first magnetic element is a permanent magnetic element and wherein the second magnetic element is an electromagnet or an electro-permanent magnet. In one embodiment, the sensed event includes a gesture that is interpreted by the processor as an instruction that is sent to the processor that causes the processor that causes the magnetic circuit to provide a gesture based magnetic repulsion force that forces the lid to rotate away from a base a pre-defined angular distance.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A laptop computer, comprising:
   a first component comprising:
      a capacitive touch sensor disposed on an outer surface of the first component and capable of detecting a user touch event, and
      a permanent magnet that provides a static magnetic field; and
   a second component rotationally coupled to the first component, the second component comprising:
      an electromagnet proximate the permanent magnet when the first and second components are positioned in a closed configuration, the electromagnet including a core that is attracted to the static magnetic field of the permanent magnet, and
      a processor capable of activating the electromagnet such that a repulsion force is generated between the electromagnet and the permanent magnet;
   wherein the processor is configured to activate the electromagnet in response to a detection signal from the capacitive touch sensor that indicates detection of the user touch event at the outer surface of the first component.

2. The laptop computer of claim 1, wherein the first component is a lid of the laptop computer, the first component further comprising a display assembly, and the second component is a base of the laptop computer, the second component further comprising a tactile input device.

3. The laptop computer of claim 1, wherein the user touch event comprises a stimulus applied at the outer surface of the first component.

4. The laptop computer of claim 1, wherein the capacitive touch sensor comprises the entire outer surface of the second component.

5. The laptop computer of claim 1, further comprising:
   a hinge that rotationally couples the first component and the second component; and
   an automated clutch assembly including:
      a rotatable shaft;
      a brake that applies a variable resistive force to the rotatable shaft that inhibits rotational motion of the first component relative to the second component, and
      an actuator coupled to and configured to act upon the brake in response to the detection signal.

6. A method for opening an electronic device, the electronic device comprising a first component rotationally coupled to a second component, the first component including (i) a capacitive touch sensor capable of detecting a user touch event on an outer surface of the first component and (ii) a permanent magnet providing a static magnetic field, the second component including (i) an electromagnet proximate the permanent magnet when the laptop computer is in a closed configuration, the electromagnet including a core that is attracted to the static magnetic field of the permanent magnet, and (ii) a processor capable of activating the electromagnet, the method comprising:
   detecting the user touch event by the capacitive touch sensor;
   transmitting a detection signal to the processor that indicates detection of the user touch event at the outer surface of the first component; and
   activating the electromagnet in response to the detection signal, wherein the electromagnet, when activated, generates a repulsion force between the permanent magnet and the electromagnet.

7. The method of claim 6, further comprising:
deactivating the electromagnet when no touch event is detected at the outer surface of the first component.

8. The method of claim 6, further comprising:
providing a variable resistive force that inhibits rotational motion of the first component relative to the second component within an automated clutch assembly at the electronic device when no touch event is detected at the outer surface of the first component.

9. The method of claim 6, further comprising:
sending a command from the processor to the automated clutch assembly in response to the detection signal, wherein the automated clutch assembly reduces the resistive force that inhibits the rotational motion of the automated clutch assembly based on the command.

10. A laptop computer, comprising:
a lid comprising:
   a capacitive touch sensor capable of detecting a touch event at an outer surface of the lid,
   a display assembly, and
   a permanent magnet providing a magnetic field;
a base comprising:
   a tactile input device,
   a processor, and
   an electromagnet having a powered state and a non-powered state, the electromagnet including a core component that is attracted to the permanent magnet when the electromagnet is in the non-powered state; and
a hinge including a clutch assembly that rotationally couples the base and the lid, the clutch assembly including a torque component that provides a variable torque to a rotatable shaft of the hinge based on a relative rotational position of the lid and the base, wherein the torque component provides a first torque that is capable of maintaining the lid in a closed position relative to the base;
wherein the capacitive touch sensor provides a detection signal to the processor in response to the touch event that causes the processor to activate the electromagnet, transitioning the electromagnet from the non-powered state to the powered state, that generates a repulsion force between the electromagnet and the permanent magnet based on the magnetic field, and the repulsion force overcomes the first torque causing the lid to rotate relative to the base.

11. The laptop computer of claim 10, wherein the sensed event comprises a user touch event at an outer surface of the lid.

12. The laptop computer of claim 10, wherein the sensor comprises a capacitive touch sensor located at an outer surface of the lid.

13. The laptop computer of claim 10, wherein the touch event comprises a gesture that is interpreted by the processor as an instruction that causes the processor to activate the electromagnet to generate the repulsion force.

14. The laptop computer of claim 10, wherein the electromagnet in the non-powered state assists to maintain the lid in a closed position relative to the base.

15. The laptop computer of claim 5, wherein the clutch assembly is capable of providing the variable torque based on an angle between the first component and the second component.

* * * * *